(No Model.)
W. H. KELLEHER.
STREET CAR POLE.
No. 328,121. Patented Oct. 13, 1885.
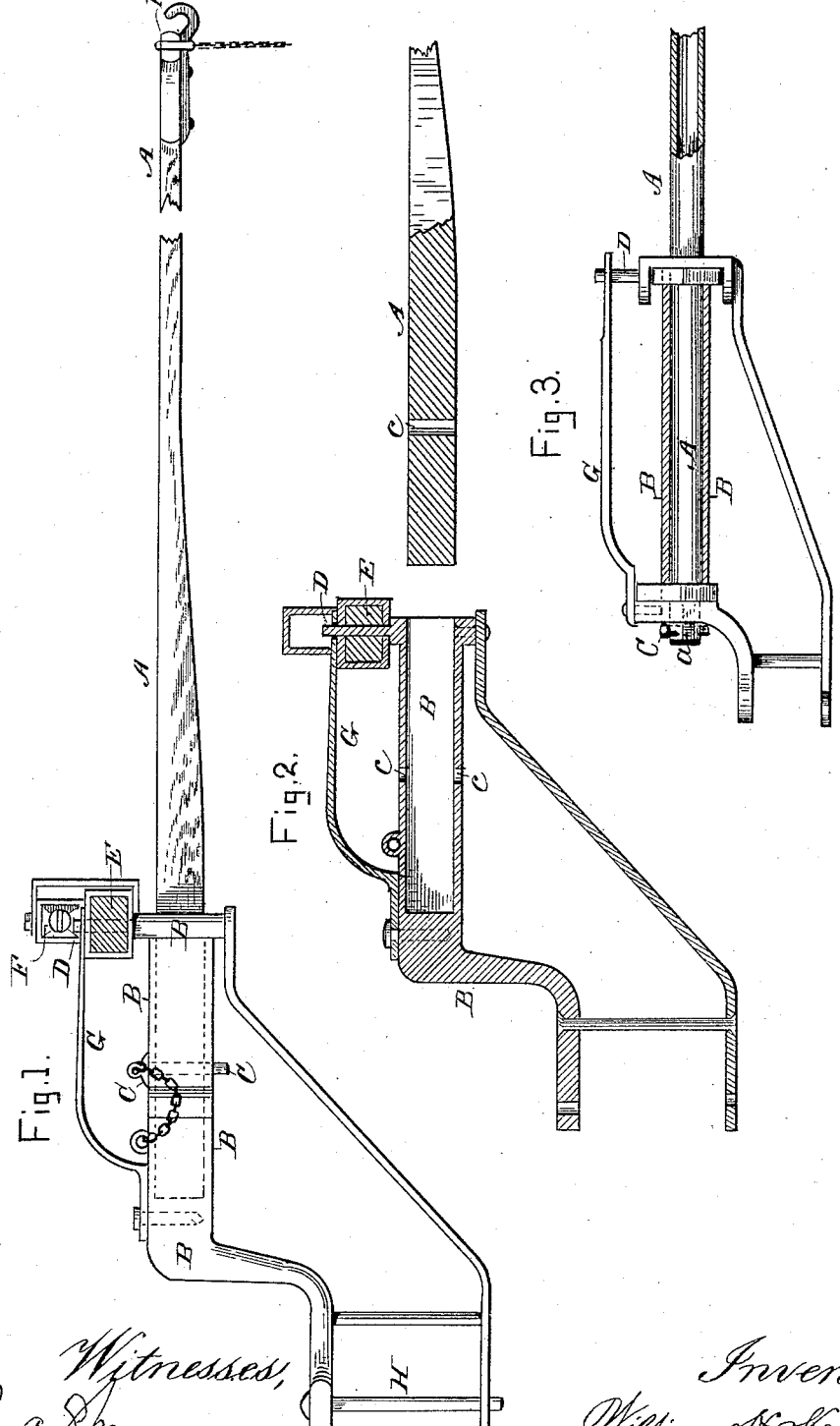

UNITED STATES PATENT OFFICE.

WILLIAM H. KELLEHER, OF BOSTON, MASSACHUSETTS, ASSIGNOR OF ONE-HALF TO BENJAMIN F. ANTHONY, OF SAME PLACE.

STREET-CAR POLE.

SPECIFICATION forming part of Letters Patent No. 328,121, dated October 13, 1885.

Application filed July 17, 1884. Serial No. 137,922. (No model.)

*To all whom it may concern:*

Be it known that I, WILLIAM H. KELLEHER, a citizen of the United States, residing at Boston, in the county of Suffolk and State of Massachusetts, have invented certain new and useful Improvements in Shifting Poles for Horse-Cars; and I do hereby declare that the same are fully described in the following specification and illustrated in the accompanying drawings.

The object of this invention is to furnish for horse-cars an improved draft apparatus having a detachable shifting pole, which may be readily inserted and removed without disturbing the double-tree or evener by which the animals are attached to the car. It is frequently necessary to change from two horses to four, or from four to two, at different hours of the day or at various points on the route, and it is customary to use two horses without a pole and four horses with a pole, so that the span in advance may pull from a hook at the outer end of the pole. Heretofore the pole being made fast to the draw-head, it has been necessary, in making these shifts, or in case of breakage of the pole, to detach the wheel-horses from the car, and with them the whiffletrees, in order to attach the pole and the draft apparatus thereto connected; and in changing back again to two horses without a pole entire detachment has been again required. This demands not only extra labor and delay but also a duplication of draw-heads and whiffletrees, which by my improvements are avoided.

I am aware of the expired patents to Robinson, dated December 4, 1866, and January 8, 1867, for "horse-car poles," neither of which has any draft-hook or substitute therefor at the tip of the pole, and hence they could not be used for the purposes of my invention. Furthermore, the first of said patents has the pole permanently keyed to the draw-head, and not readily detachable therefrom, while the latter one has no pin or other means of fastening the pole temporarily or permanently to the draw-head.

My improvement consists in a draw-head having a pole-socket, in combination with a detachable and insertible pole, provided at its forward end with a whiffletree-hook or equivalent device for attachment of the leading span, and also with a coupling-pin connecting the rear end of the pole detachably with said socket, whereby the power of the leading horses is applied to the draw-head or disconnected from it without disturbing the connection of the other span therewith.

In the drawings, Figure 1 is an elevation of the draw-head with its socket and pin to receive and temporarily hold the pole; Fig. 2, a section with the pole detached by removal of the pin. Fig. 3 is a modification showing the arrangement of parts when a tubular pole is used.

The pole A has at its tip a ring or hook, K, by which the extra horses are attached to the car, and the other end of the pole is shaped to fit the socket of the draw-head B, and is provided with the coupling-pin C, or with an equivalent device for the purpose of uniting them and permitting their ready separation when desired. The draw-head is also furnished with an upright pin, D, to receive the evener E and whiffletrees F, by which the horses are attached to the car, and this pin may have its upper end supported by a back-strap, G. If preferred, the evener may be a permanent fixture on the draw-head, since it does not interfere with the removal or insertion of the pole. The draw-head is secured to the car by the usual dasher-pin, H, or in any other convenient manner, so as to be readily attached or detached when required at the end of the route or elsewhere, whether the pole is in position in the socket or not.

The pole may be of wood and pinned to the draw-head, as shown in Fig. 1, or it may be a metal tube or rod inserted in a tubular socket, D, as shown in Fig. 3. In such case suitable means are provided to keep the pole from partial rotation, such as the square shank *a* in a socket of corresponding form.

I claim as my invention—

The draw-head B, having the whiffletrees mounted upon it, and formed with a socket to receive the end of the pole, in combination with the shifting pole A, detachable from the draw-head, and with the pin C, or equivalent means of detachably uniting said pole and draw-head, and provided with the draft-hook K at its tip, substantially as and for the purpose set forth.

In testimony whereof I hereto affix my signature in presence of two witnesses.

WILLIAM H. KELLEHER.

Witnesses:
A. H. SPENCER,
JOSEPH CORON.